United States Patent [19]
Parker

[11] 3,893,340
[45] July 8, 1975

[54] THERMALLY INSULATED THERMOMETER

[75] Inventor: Robert Parker, Danville, Calif.

[73] Assignee: RPR, Inc., Dublin, Calif.

[22] Filed: June 27, 1973

[21] Appl. No.: 374,214

[52] U.S. Cl. ............. 73/356; 116/114 V; 73/362.8
[51] Int. Cl. .................... G01k 11/12; G01k 11/20
[58] Field of Search ..... 73/356, 358, 362.8, DIG. 7, 73/190 R, 1 F, 359; 350/160 LC; 116/114 V

[56] References Cited
UNITED STATES PATENTS

| 964,961 | 7/1910 | Fisher | 73/359 |
|---|---|---|---|
| 3,002,385 | 10/1961 | Wahl et al. | 73/358 |
| 3,018,663 | 1/1962 | Dunlop | 73/190 |
| 3,059,474 | 10/1962 | Keller et al. | 73/358 |
| 3,690,175 | 9/1972 | Butts | 73/1 F |
| 3,704,625 | 12/1972 | Seto et al. | 73/356 |

FOREIGN PATENTS OR APPLICATIONS

| 1,138,590 | 1/1969 | United Kingdom | 23/230 LC |
|---|---|---|---|

*Primary Examiner*—Richard C. Queisser
*Assistant Examiner*—Marcus S. Rasco
*Attorney, Agent, or Firm*—Townsend and Townsend

[57] ABSTRACT

A thermometer comprising a temperature indicator and a thermally coupled insulator for contacting the object the temperature of which is to be measured. At the thermal interface between the insulator and the temperature indicator the temperature is less (or more) than the object temperature by a factor which is a function of the thermal conductivity and the still convection coefficients of the insulator as well as the ambient temperature. This permits an accurate determination of the object temperature with temperature indicating devices that have a destruct temperature that is lower (or higher) than the object temperature. The temperature indicator is preferably a liquid crystal thermometer having microencapsulated temperature responsive liquid crystal compositions thermally coupled to the insulator. Masking is preferably provided to generate visual displays of messages, common numerical indicia, etc., when the liquid crystals reach their responsive temperature range. The liquid crystals are applied in thin films of a thickness of no more than a few thousandths of an inch so that an accurate determination of the surface temperature on the object is possible.

17 Claims, 6 Drawing Figures

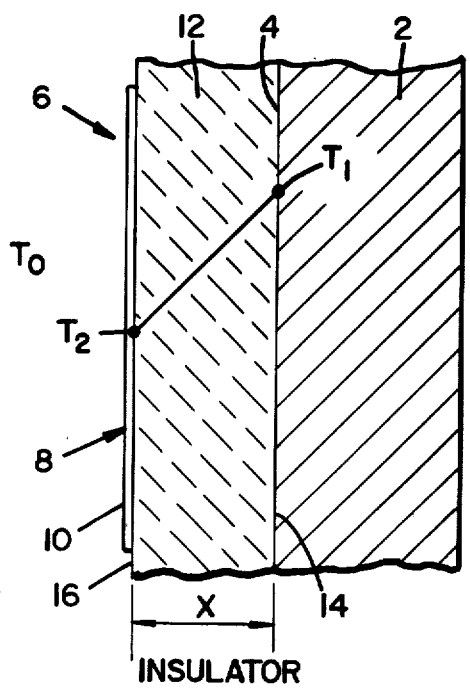
FIG_1
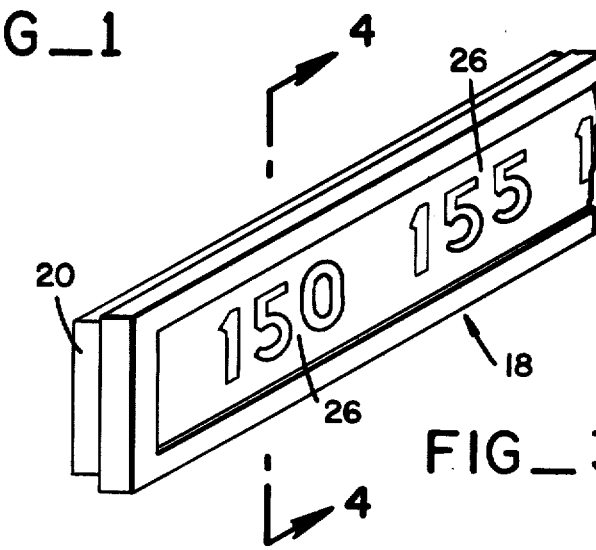
FIG_3
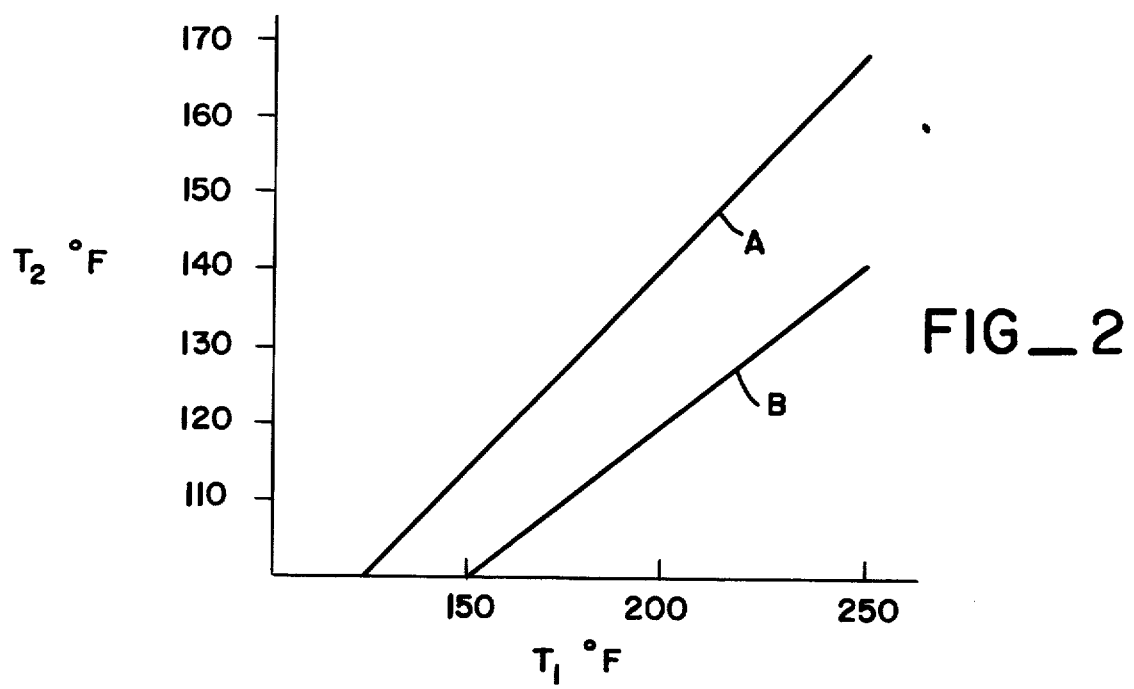
FIG_2
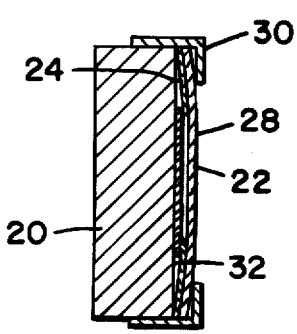
FIG_4
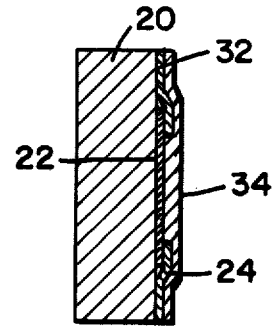
FIG_5
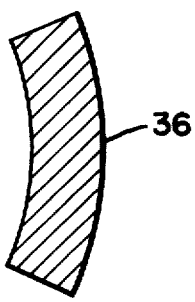
FIG_6

THERMALLY INSULATED THERMOMETER

CROSS REFERENCE TO RELATED APPLICATIONS

The subject matter of this patent application is technically related to my copending patent application Ser. No. 263,064, filed June 15, 1972, for DIGITAL THERMOMETER, my copending patent application bearing Ser. No. 351,220, filed Apr. 16, 1973, for DIGITAL THERMOMETER AND METHOD OF MANUFACTURE, which is a continuation-in-part application of said Ser. No. 263,064 application, and my copending patent application Ser. No. 290,199, filed Sept. 18, 1972, for FIN COOLED TEMPERATURE SENSOR EMPLOYING LIQUID CRYSTALS; now U.S. Pat. No. 3,827,301. The disclosures of these copending patent applications are incorporated herein by reference.

BACKGROUND OF THE INVENTION

As is more fully discussed in the above-referenced copending patent applications, temperature indicators have been devised which employ liquid crystal compositions which change their reflectance and/or color in certain well-defined and known temperature ranges. Generally speaking, liquid crystal compositions are readily changed to make them responsive to different temperature ranges. A number of differing liquid crystal compositions responsive over different, contiguous temperature ranges can be combined to form a temperature indicating device or thermometer as is disclosed in the copending patent applications.

Temperature responsive liquid crystals are commercially available from Liquid Crystal Industries, Turtle Creek, Pennsylvania and Hoffman-LaRoche, Nutley, New Jersey. United States patents of interest and relating to liquid crystals include U.S. Pat. Nos. 3,440,882; 3,585,381; 3,617,374; 3,619,254; 3,633,425; 3,667,039; 3,696,297; and 3,704,625. Also of interest is the British analog of U.S. Pat. No. 3,697,297, British Pat. No. 1,138,590.

Liquid crystal thermometers are readily adapted for varied use by varying the type of liquid crystal composition employed. Thus, compositions with wide or narrow temperature responsive ranges can be employed. Irreversible temperature responsive liquid crystals can be used so that once the transition has occurred, the liquid crystals do not revert to their original state. An alternative composition is one which fades only extremely slowly, that is one in which the liquid crystals change their reflectance so that a peak temperature is registered, but revert only slowly to their original state to thereby retain the registered peak temperature for reasonably long periods of time, for example a day or two. Such a composition can be used by itself or in combination with the rapidly reversible thermally responsive liquid crystals, so that one can see the present temperature and the highest temperature which has occurred within the previous fixed period.

Liquid crystal compositions employed in such thermometers are generally provided as microencapsulated capsules having sizes in the range of one micron to about 5,000 microns as the average dimension, more usually from about 10 to 50 microns. The microencapsulated liquid crystal compositions are found to be essential to the successful operation of a liquid crystal thermometer over extended periods of time. A description of the method of preparation of the microencapsulated temperature responsive liquid crystals may be found in British Pat. No. 1,138,590.

Generally speaking, liquid crystals can be made as follows: acid extracted pigskin gelatin (1.25 g), having a bloom strength of 250–305 g and an isoelectric point of pH 8–9, and 1.25 g of gum arabic, are stirred with 125 g of distilled water at 55° C in a Waring blender to yield a solution of about pH 4.5. The pH is initially adjusted to 6.0 when the solution is formed by the dropwise addition of 20 weight percent aqueous sodium hydroxide. To the above solution is added a solution of 2 g of cholesteryl propionate in 8 g of cholesteryl oleate. The cholesteryl derivative materials aree emulsified in the Waring blender vessel to an average droplet size of 10–50μ and the pH slowly reduced by the dropwise addition of 14 weight percent aqueous acetic acid. The addition of the acid is continued until the single, liquid-walled capsules cluster to form aggregates having diameters of about 25–100μ. At this time, the pH is about 5.

The mixture is then chilled with an ice bath to below 10° C, while the agitation is continued. At 10° C, 0.6 ml of a 25 weight percent aqueous solution of pentanedial, is added to the blender vessel and the system stirred for about 12 hours while slowly allowing the mixture to warm to room temperature. At the end of that time, the capsule walls are firm and hardened and the mixture is poured through a wire mesh sieve having openings of 74μ. That which passes the screen is suitable for coating the prepared liquid crystal slurry onto a base or substrate. The slurry is then allowed to dry under ambient conditions, severe drying conditions being usually avoided.

Depending on the desired temperature, various cholesteryl esters can be employed as mixtures to provide the desired temperature range. The particular compositions employed are well known in the art and the manner in which they can be prepared may be found in a number of texts such as G. H. Brown, *Liquid Crystals*, Vol. 2, Parts 1 and 2, 1969; G. H.. Brown, et al., *Chem. Rev.* 57 1049 (1957); and Asaup, Agnew, *Chem.* 7, 97 Int. Ed. (1968). For liquid crystal compositions other than cholesteryl esters, see U.S. Pat. No. 3,619,254. For the various methods by which the liquid crystal slurry may be applied to a base or substrate, see the above-referenced copending continuation-inpart application.

Liquid crystal thermometers of the type described above have many advantages over the more conventional thermometers. Their usefulness, in terms of temperature ranges that can be measured with them, has heretofore been limited because liquid crystals cannot be subjected to temperature extremes. They can withstand neither extremely high nor extremely low temperatures. Generally, liquid crystals of the type discussed above have an upper destruct temperature of about 80°–90° C. Their lower destruct temperature is presently not precisely known but is less than about −25° C. If the liquid crystals are subjected to a higher temperature, for example, they will in effect "burn," that is they will permanently change their color and will not revert in their reflectance to their normal state so that their temperature indicating properties are lost and the liquid crystal thermometer is destroyed. Since liquid crystals that could withstand such high (or low) temperatures are presently not known or available, the usefulness of prior art liquid crystal thermometers was restricted to limited temperature ranges. Thus, they were ideally suited for room temperature thermometers, for example, but they could not be used in many industrial applications where temperatures substantially in excess of 80°–90° C, or where very low temperatures are encountered. Thus, the peculiar advantages of liquid crystal thermometers, such as their ability to provide a direct visual temperature readout which can be viewed from relatively far away could not be utilized wherever temperature extremes were encountered.

SUMMARY OF THE INVENTION

The present invention enables the use of liquid crystal thermometers for measuring relatively high and low temperatures substantially in excess of the liquid crystal destruct temperature of 80°–90° C and as low as −100° to −250° C without destroying the liquid crystals and, thereby, the liquid crystal thermometer. Whenever reference is made in this specification or in the claims to or destruct temperature range and when not expressly stated otherwise, both the upper and the lower destruct temperatures destruct temperature range for the thermometer or the liquid crystals are included in the term so as to include within the description and the coverage of the claims the thermal protection provided by the present invention against temperatures both above and below the applicable upper and lower destruct temperature points for the thermometer.

Consequently, the term "operative temperature range" of the thermometer is equivalent to "outside the destruct temperature range" and includes temperatures which are both "less than", "lower than", or "no more than" theupper destruct temperature as well as temperatures which are "more than", "higher than" or "no less than" the lower destruct temperature of the liquid crystal thermometer.

Broadly speaking, in accordance with the present invention a thermometer, such as a liquid crystal thermometer, is thermally coupled to an insulator which has a known and constant heat conductivity coefficient and a known and constant still convection coefficient. The insulator is placed into intimate, thermally coupling contact with the surface of an object the temperature of which is to be measured and its thickness $x$ is selected so that $$x = k \frac{T_1 - T_2}{h(T_2 - T_0)}$$

wherein
  $k$ is the thermal conductivity coefficient for the insulator;
  $h$ is the still convection coefficient for the insulator;
  $T_1$ is the maximum object temperature;
  $T_2$ is less than the destruct temperature for the liquid crystals; and
  $T_0$ is the ambient temperature.

The insulator is made from any one of a large number of suitable materials all of which have a thermal conductivity coefficient $k$ of about 0.025 BTU/sq. ft./°F such as ground or particulate cork sheets, foam, asbestos, felt, corrugated cardboard, diatomaceous earth, fiber insulating board or the like, all of which are readily available on the market.

The liquid crystals are thermally coupled to the insulator by either applying them in the above-described manner directly to the insulator surface opposite from the object, and suitably covering the applied liquid crystals to protect them against physical damage, or by applying the crystals to a substrate such as a transparent film or sheet which in turn is biased towards the insulator to thereby place the liquid crystals in intimate contact with the insulator.

The thermometer of the present invention is capable of indicating the object temperature even though the liquid crystals are subjected to a much lesser temperature by selecting the insulator as set forth above. The temperature of the liquid crystals will then never exceed their destruct temperature. When a given liquid crystal composition enters its temperature responsive range (hereinafter usually referred to as "response temperature"), that is when it changes color or reflectance, the temperature of the object surface can be precisely determined since the insulator's heat conductivity and convection rate are known and constant. the thermometer of the present invention therefore preferably also includes means for displaying a temperature responsive message such as means displaying the actual object surface temperature. such means preferably comprise masking over the liquid crystal composition which displays a number $$N = \frac{T_2(xh + k) - xhT_0}{k}$$

wherein $T_1$ is the response temperature for the liquid crystal so that $N$ equals the temperature of the object surface in degrees and becomes visible when the liquid crystal composition, which is at a lower temperature than the object surface, is at its response temperature. Since the response temperature for liquid crystals is usually a relatively narrow temperature range, $T_1$ will usually be the median of such temperature range although $T_1$ can also represent the upper or lower limit of the range.

Although the present invention is theoretically applicable to any insulator thickness practical considerations will usually limit it to insulator thicknesses of no more than approximately 2 inches because of the three-dimensional heat transfer through the insulator. If the insulator thickness is increased beyond about 2 inches, substantial head transfer takes also place in lateral directions perpendicular to the insulator surface that is interfaced with the liquid crystals. The actual insulator temperature at the interface then becomes a more complicated function and is more difficult to determine than set forth above, although it is by no means impossible.

It is thus apparent that the present invention vastly increases the usefulness of liquid crystal thermometers which can now find wide application in industry for indicating temperatures of relatively high temperature objects such as pipes carrying steam or other hot fluids, boilers, vessels, furnace walls and the like. Similarly, liquid crystal thermometers can now also be used to measure low temperature objects such as the temperature of vessels, conduits and the like carrying liquified gases having temperatures as low as −100° C to −250° C. The liquid crystal thermometer of the present invention can be constructed as above described to provide absolute temperature indications in degrees over a given range by combining a number of liquid crystal compositions each having a different response temperature, or it can simply be used for indicating the operativeness of an installation, say of a pipe carrying hot steam by displaying a clearly visible message such as "hot" or "active." The thermometer, by constructing the display means to provide written messages through appropriate masking, can also be used as a warning device for persons to indicate that a particular installation is hot or cold and, therefore, dangerous and to be stayed away from.

Another aspect of the invention relates to the precision measuring of the surface temperature of an object. Prior art thermometers are inherently ill-adapted for measuring surface temperatures, say on the surface of a heated conduit, since they employ liquids, such as mercury, that is stored in a vessel. If the vessel is brought into contact with the conduit surface relatively little heat transfer takes place while, at the same time, there is substantial heat loss between the vessel and the surrounding atmosphere. Consequently, the measured temperature is relatively inaccurate and, moreover, the response of such a thermometer is slow since it requires a substantial time to heat the large mercury volume via the very small contact surface or thermal interface between the conduit and the vessel. To alleviate this problem, conventional mercury and the like thermometers have been replaced with thermocouples. A much more accurate temperature reading is possible. However, supporting electronic circuitry is required which renders such thermometers very expensive and, for many applications, economically unfeasible.

In accordance with this aspect of the present invention, surface temperatures are accurately measured by subjecting a thin liquid crystal composition film to the conduit surface, the temperature of which is to be measured. If the conduit surface exceeds the destruct temperature range for the liquid crystals, the thermometer is provided with an insulator as above described. Otherwise, the liquid crystals can be directly applied to the conduit surface. Since the liquid crystal composition film has a thickness of only a few thousandths of an inch as compared to its surface area which is defined by dimensions in the order of large fractions of an inch up to more than an inch and thus, many thousands times greater than the film thickness, there is an excellent and substantially immediate heat transfer through a large heat transfer area to a relatively very small liquid crystal volume without the heat losses encountered with prior art mercury thermometers and the like. The present invention therefore also enables the accurate determination of surface temperatures.

BRIEF DESCRIPTION OF THE DRAWINGS

FIG. 1 is an enlarged, schematic view, in section through an object the surface temperature of which is to be measured with a thermometer constructed in accordance with the present invention;

FIG. 2 is a graph of the actual temperature of a thermometer fitted with an insulator as a function of the object surface temperature;

FIG. 3 is a fragmentary perspective view of a thermometer constructed in accordance with the present invention;

FIG. 4 is a cross-sectional view and is taken on line 4—4 of FIG. 3;

FIG. 5 is a cross-sectional view of a thermometer similar to FIG. 4 but illustrates another embodiment of the invention; and FIG. 6 is a view similar to FIG. 4 but illustrates another embodiment of the invention.

DESCRIPTION OF THE PREFERRED EMBODIMENTS

Referring first to FIG. 1, an object such as a wall 2 has a wall surface 4 the temperature of which is to be measured with a temperature indicating device or thermometer 6 constructed in accordance with the invention. Principally, the thermometer comprises temperature responsive means such as a thin film 8 of a liquid crystal composition 10 which is thermally coupled to wall surface 4 with a thermal insulator 12 having first and second faces 14 and 16 thermally coupled with the wall surface and the thermometer, respectively.

The insulator has a constant thermal conductivity coefficient and a constant still convection coefficient so that when its first face 14 is subjected to wall temperature $T_1$, its second face 16 has a temperature $T_2$ which is a linear function of $T_1$ assuming a steady state and equilibrium, that is a constant $T_1$, a constant ambient temperature $T_0$ and no forced ambient air convection so that the heat input at insulator face 14 is $$Q_1 = \frac{k}{x}(T_1 - T_2)$$

and equals $$Q_2 = h(T_2 - t_0)$$

,wherein $k$ is the thermal conductivity coefficient for the insulator in BTU/hour/ft. sq./ft./°F and $h$ equals the still convection film coefficient for the insulator (hereinafter convection coefficient).

For a given insulator material and thickness $x$, a given $T_1$ and a given $T_0$ the temperature at the second insulator face 16 to which the liquid crystal film is exposed then becomes:

$$T_2 = \frac{\frac{k}{x}T_1 + T_0 h}{h + \frac{k}{x}}$$

Assuming a typical value for $h = 2$ BTU/ft. sq. 1°F, an insulator thickness $x = 1/8$ inches, $k = 2.4$ BTU/ft. sq. and a wall surface temperature $T_1 = 200°$ F then $T_2 = 118°$ F. For $T_1 = 150°$ F, $T_2$ would equal $100°$ F.

$T_2$ values can be determined for other insulator thicknesses, say for $x = ¼$ inch in which case $k/x = 1.2$ BTU/ft. sq.

Referring now briefly to FIG. 2, the diagram plots $T_2$ in degrees F on the ordinate and $T_1$ in degrees F on the abscissa. Line A shows the relationship between $T_1$ and $T_2$ for the abovediscussed case for ⅛ inch thick insulating material and line B for ¼ inch thick insulating material. Thus, if $T_1$ were 200° and the maximum temperature for the liquid crystals $T_2$ should not exceed 140° F, a ⅛ inch thick insulator suffices. On the other hand, if $T_2$ is not to exceed approximately 115° F, a ¼ inch thick insulator is to be chosen.

Referring again to FIG. 1, for any given application the necessary insulator thickness $x$ is determined as follows:

$$x = \frac{T_1 - T_2}{h(T_2 - T_0)}$$

wherein $T_2$ is less than the destruct temperature for the temperature indicating device, e.g., the destruct temperature for the liquid crystal composition, and $T_1$ is the maximum temperature of wall 2.

Referring now to FIGS. 3–6, a thermometer 18 constructed in accordance with the invention again comprises the insulator 20, a liquid crystal composition 22 and means for displaying a message with the liquid crystal composition when the composition reaches its response temperature. Such means comprises masking 24 which hides a portion of the liquid crystal composition from view while permitting the viewing of a remainder thereof. This remainder may define numerals 26 or any other message such as a picture (not shown) or a written word or words (not shown).

When the temperature indicating device is used as a thermometer to indicate a given temperature, masking 24 will usually define numerals 26. The particular numeral defined by the masking is determined by the response temperature of the underlying liquid crystal composition. Since the desired temperature information will be the wall surface temperature $T_1$ and not the response temperature of the liquid crystals the numeral $$N = \frac{(T_2 hx + k - xhT_0)}{k}$$

wherein $T_2$ is the response temperature of the liquid crystal composition;

$T_0$ is the ambient temperature;

$x$ is the thickness of the insulating material; and $k$ and $h$ are as above defined.

$N$ thus is a number equal to the actual temperature in degrees on wall surface 4 when the liquid crystal composition reaches its response temperature and the thermometer provides a digital readout for that wall temperature even though the liquid crystals are never subjected to such temperature.

The actual construction of thermometer 18 can take any number of forms. Thus, as shown in FIG. 4, the liquid crystal composition can be applied to one side of a transparent or at least translucent substrate 28 to which masking 24 has previously been applied in a manner more fully described in the above-referenced copending continuation-in-part application. A frame 30 is provided to retain the substrate to insulator 20 and is constructed so that it biases the substrate towards insulator face 32 and thereby biases the liquid crystals into intimate contact with the insulator to form a thermal coupling between the insulator and the liquid crystals and assure a complete heat transfer. The substrate can of course be biased against the insulator in any other manner such as by bonding, riveting or bolting it thereto.

Referriing now particularly to FIG. 5, the liquid crystal composition 22 can also be directly applied to face 32 of insulator 20. Masking 24 is then applied subsequently and a protective layer such as a transparent coating 34 can be applied over the masking and the crystal composition to protect them from physical abrasion and damage. FIG. 6 shows another embodiment fo the invention in which an insulator 36 has an arcuate configuration for placement against arcuate wall surfaces to assure intimate contact and complete thermal coupling between the insulator and the wall surface. The application of the liquid crystal composition and the masking, if any, can be performed as above described.

The thermometer illustrated in FIG. 3 has several temperature indicative numbers. To function as a thermometer each number must of course overlie a liquid crystal composition having a corresponding response temperature as is fully described in the above-referenced copending patent applications.

I claim:

1. Apparatus for measuring relatively extreme temperatures comprising an insulator having a first surface for attachment to an object the temperature of which is to be measured and a second surface opposite and spaced apart from the first surface, the insulator having a known and constant thermal conductivity coefficient and a constant still convection coefficient so that the temperature at the second surface is a linear function of the temperature of the object, liquid crystal a thermometer thermally coupled to the second surface, and means cooperating with the thermometer for indicating the temperature of the object.

2. Apparatus according to claim 1 wherein the crystals are applied to a surface of the insulator.

3. Apparatus for measuring the temperature on the surface of an object with liquid crystals and in which the object surface temperature is within a known range and in the destruct temperature range for the liquid crystals, the apparatus comprising; a layer of a thermally insulating material having parallel first and second surfaces for affixing the first surface to the object, the material having a constant thermal conductivity coefficient so that the temperature on the second surface is lower than and a linear functin of the temperature on the first surface and a liquid crystal thermometer means thermally interfaced with the second surface of the insulator and having at least one liquid crystal composition, the liquid crystal composition being responsive to a temperature range which is less than the temperature at the surface of the object and having a known destruct temperature, the insulator further having a sufficient thickness so that the temperature at the second surface is always outside the destruct temperature range of the composition.

4. Apparatus according to claim 3 including means cooperating with the liquid crystal composition for visually displaying a message indicative of the temperature at the object surface.

5. Apparatus according to claim 4 wherein the thermometer means comprises a transparent substrate, wherein the liquid crystal composition is between the second surface and the substrate, and wherein the displaying means comprises means masking a portion of the liquid crystal composition from viewing through the substrate so that a remainder of the liquid crystal composition becomes visible through the substrate in said responsive temperature range to thereby visually indicate a message.

6. Apparatus according to claim 5 wherein the masking defines a written message which becomes visible when the liquid crystal composition is in said temperature range.

7. Apparatus according to claim 5 wherein the message defines a number $$N = \frac{T_2(xh+k) - xhT_0}{k}$$

and wherein $T_2$ is the response temperature of the liquid crystal composition;
$T_0$ is the ambient temperature;
$x$ is the thickness of the insulating material;
$k$ is the thermal conductivity coefficient for the material;
$h$ is the still convection coefficient for the insulating material;
so that said number corresponds to the temperature in degrees of said object surface.

8. Apparatus according to claim 3 wherein the liquid crystal composition has a destruct temperature of less than about 90° C, and wherein the insulating material has a thickness $x$ $$x = k \frac{T_1 - T_2}{h(T_2 - T_0)}$$

and wherein $T_1$ is the maximum temperature of said object surface;
$T_2$ is less than about 90° C;
$T_0$ is the ambient temperature to which the apparatus is subjected;
$k$ is the thermal conductivity coefficient for the insulating material;
$h$ is the convection coefficient for the insulating material;
so that the temperature to which the liquid crystals are subjected is never exceeds in the liquid crystal composition destruct temperature range.

9. Apparatus according to claim 3 wherein the thermometer means comprise a substrate overlying the second surface, wherein the composition is applied to the substrate, and including means biasing the substrate towards the insulating material to thereby bias the composition against the second surface and thermally couple it with the insulating material.

10. A liquid crystal thermometer capable of measuring and communicating temperatures of an object in excess of the destruct temperature range for the liquid crystal comprising at least one liquid crystal composition responsive to a known temperature range, means for displaying a message when the composition reaches the known temperature range, a double-faced insulator of a constant thickness, a first face being thermally coupled with the composition and a second face being for attachment to the object, wherein $$x = k \frac{(T_1 - T_2)}{h(T_2 - T_0)} \text{ and}$$

$x$ is the thickness of the insulator between the faces;
$T_1$ is the maximum temperature of the object to which the insulator is attached;
$T_2$ is inside the destruct temperature range for the liquid crystal composition;
$T_0$ is the ambient temperature to which the insulator is subjected;
$k$ is the thermal conductivity coefficient for the material of the insulator; and
$h$ is the still convection coefficient for the insulator;
the display means including means communicating a message indicating to a viewer the temperature $T_1$.

11. Apparatus according to claim 10 wherein the displaying means indicates the temperature $T_1$ in degrees.

12. Apparatus according to claim 11 wherein the display means comprises masking means defining the number $$N = \frac{T_2(xh+k) - hxT_0}{k}$$

and wherein $T_2$ is the response temperature of the liquid crystal composition, so that $N$ corresponds to the temperature of the object in degrees when the composition is subjected to a temperature in its responsive temperature range.

13. Apparatus according to claim 10 including means for protecting the composition, wherein the displaying means comprises masking means, and wherein the masking means is applied to the protecting means.

14. Apparatus according to claim 13 wherein the composition is affixed to the protecting means, and including means for biasing the protecting means toward the first face to thereby thermally couple the composition and the insulator.

15. A method for measuring the temperature on the surface on an object with a liquid crystal type thermometer and wherein the object surface temperature can range beyond the destruct temperature of the liquid crystals, the method comprising the steps of thermally coupling an insulator having a uniform thickness to the object surface, the insulator having a sufficient thickness so that the temperature at its exposed side is within the operative temperature range for the liquid crystal when the object surface temperature is in the destruct temperature range for the crystals, applying at least one liquid crystal film having a thickness in the order of a few thousandths of an inch to the exposed insulator side, and identifying a temperature response in the composition as resulting from a given, different temperature at the object surface.

16. A method according to claim 15 wherein the step of identifying comprises the step of displaying a written message activated by a response in the liquid crystal composition.

17. A method according to claim 16 wherein the step of displaying comprises the step of displaying a number $$N = \frac{T_2(xh+k) - zhT_0}{k}$$

wherein $T_0$ is the ambient temperature in degrees;
$T_2$ is the response temperature for the liquid crystal composition;
$x$ is the thickness of the insulator;
$k$ is the thermal conductivity coefficient for the insulator; and
$h$ is the still convection coefficient for the insulator.

* * * * *